United States Patent
Zhang

(10) Patent No.: US 10,122,816 B2
(45) Date of Patent: *Nov. 6, 2018

(54) HTTP PROXY

(71) Applicant: Fortinet, Inc., Sunnyvale, CA (US)

(72) Inventor: Jianwen Zhang, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,790

(22) Filed: Feb. 18, 2017

(65) Prior Publication Data

US 2017/0163758 A1    Jun. 8, 2017

Related U.S. Application Data

(63) Continuation of application No. 14/667,594, filed on Mar. 24, 2015, now Pat. No. 9,609,078.

(51) Int. Cl.
*H04L 29/06* (2006.01)
*H04L 29/08* (2006.01)

(52) U.S. Cl.
CPC .......... *H04L 67/2823* (2013.01); *H04L 67/02* (2013.01); *H04L 67/2828* (2013.01); *H04L 67/327* (2013.01); *H04L 67/42* (2013.01); *H04L 69/08* (2013.01); *H04L 69/22* (2013.01)

(58) Field of Classification Search
CPC .................. H04L 67/2823; H04L 67/2828
USPC ........ 709/228, 238, 239, 240, 242; 370/252, 370/389, 422, 468
See application file for complete search history.

(56) References Cited

U.S. PATENT DOCUMENTS

| | | |
|---|---|---|
| 5,991,795 A | 11/1999 | Howard et al. |
| 7,801,993 B2 | 9/2010 | Shitomi |
| 8,107,452 B1 * | 1/2012 | Upadhyay ............... H04W 4/18 370/338 |
| 9,609,078 B2 | 3/2017 | Zhang |
| 2002/0109706 A1 * | 8/2002 | Lincke ................ G06F 17/3089 715/700 |

(Continued)

OTHER PUBLICATIONS

"Hypertext Transfer Protocol HTTP/1.1"—Fielding et al, RFC 2616, W3.org, Jun. 1999 (Year: 1999) http://www.w3.org/Protocols/HTTP/1.1/rfc2616.pdf.*

(Continued)

*Primary Examiner* — Randy A Scott
(74) *Attorney, Agent, or Firm* — Hamilton, DeSanctis & Cha LLP

(57) ABSTRACT

Systems and methods for translating between an older version of HTTP and a newer version of HTTP are provided. According to an embodiment, a first request message, compliant with the newer version and directed to a server that supports the older version but does not support the newer version, is received by the proxy from a client that supports the newer version. A second request message, compliant with the older version, is created by the proxy by translating the first request message. The second request message is sent to the server by the proxy. A first response message, compliant with the older version and directed to the client, is received by the proxy from the server. A second response message, compliant with the newer version, is created by the proxy by translating the first response message. The second response message is sent to the client by the proxy.

28 Claims, 6 Drawing Sheets

(56) References Cited

U.S. PATENT DOCUMENTS

| | | | |
|---|---|---|---|
| 2009/0024752 A1 | 1/2009 | Shitomi | |
| 2011/0119323 A1* | 5/2011 | Tani | H04L 67/04 709/203 |
| 2014/0304498 A1* | 10/2014 | Gonuguntla | H04L 63/168 713/151 |
| 2015/0032804 A1* | 1/2015 | Fablet | H04L 67/26 709/203 |
| 2015/0271233 A1* | 9/2015 | Bouazizi | H04L 65/60 709/219 |
| 2016/0285989 A1 | 9/2016 | Zhang | |
| 2017/0026481 A1* | 1/2017 | Stephan | H04L 67/2814 |

OTHER PUBLICATIONS

Peon, R. et al. "HPACK: Header Compression for HTTP/2." HTTPbis Working Group. 48 pgs. May 2015.
Notice of Allowance for U.S. Appl. No. 14/667,594 dated Dec. 22, 2016.

\* cited by examiner

HTTP PROXY

CROSS-REFERENCE TO RELATED PATENTS

This application is a continuation of U.S. patent application Ser. No. 14/667,594, filed on Mar. 24, 2015, now U.S. Pat. No. 9,609,078, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2015-2017, Fortinet, Inc.

BACKGROUND

Field

Embodiments of the present invention generally relate to the field of computer networks. In particular, various embodiments relate to enabling hypertext transfer protocol (HTTP) servers that support prior versions of HTTP to handle HTTP messages associated with one or more subsequent versions of HTTP.

Description of the Related Art

HTTP version 2.0 (HTTP/2) has finally been released 15 years after HTTP version 1.1. HTTP/2 has a lot of technical advantages over HTTP/1.x (referred as to HTTP/1 hereafter), such as multiplexed streams over a single Transmission Control Protocol (TCP) connection and header compression. To achieve the beneficial goals, HTTP/2 adds a new binary framing layer, which is not backward compatible with previous HTTP 1.x servers and clients. Millions of servers must be updated to use the new binary framing layer, and billions of clients must similarly update their browsers and networking libraries. Most modern browsers use efficient background update mechanisms, which will enable HTTP/2 support quickly and with minimal intervention for a large portion of existing users. However, web server upgrades to support HTTP/2 will be much later than the browser side as a result of all kinds of technical and non-technical concerns. Therefore, there is a need for an HTTP proxy to translate between HTTP/2 messages and HTTP/1 messages so that HTTP/2 clients may access HTTP/1 servers.

SUMMARY

Systems and methods are described for translating between an older version of HTTP and a newer version of HTTP by an HTTP proxy. According to an embodiment, a first HTTP request message that is compliant with the newer version of HTTP is received by the HTTP proxy from a client that supports the newer version of HTTP and directed to a server that supports the older version of HTTP but does not support the newer version of HTTP. A second HTTP request message that is compliant with the older version of HTTP is created by the HTTP proxy by translating the first HTTP request message. The second HTTP request message is sent to the server by the HTTP proxy. A first HTTP response message that is compliant with the older version of HTTP and directed to the client is received by the HTTP proxy from the server. A second HTTP response message that is compliant with the newer version of HTTP is created by the HTTP proxy by translating the first HTTP response message. The second HTTP response message is sent to the client by the HTTP proxy.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
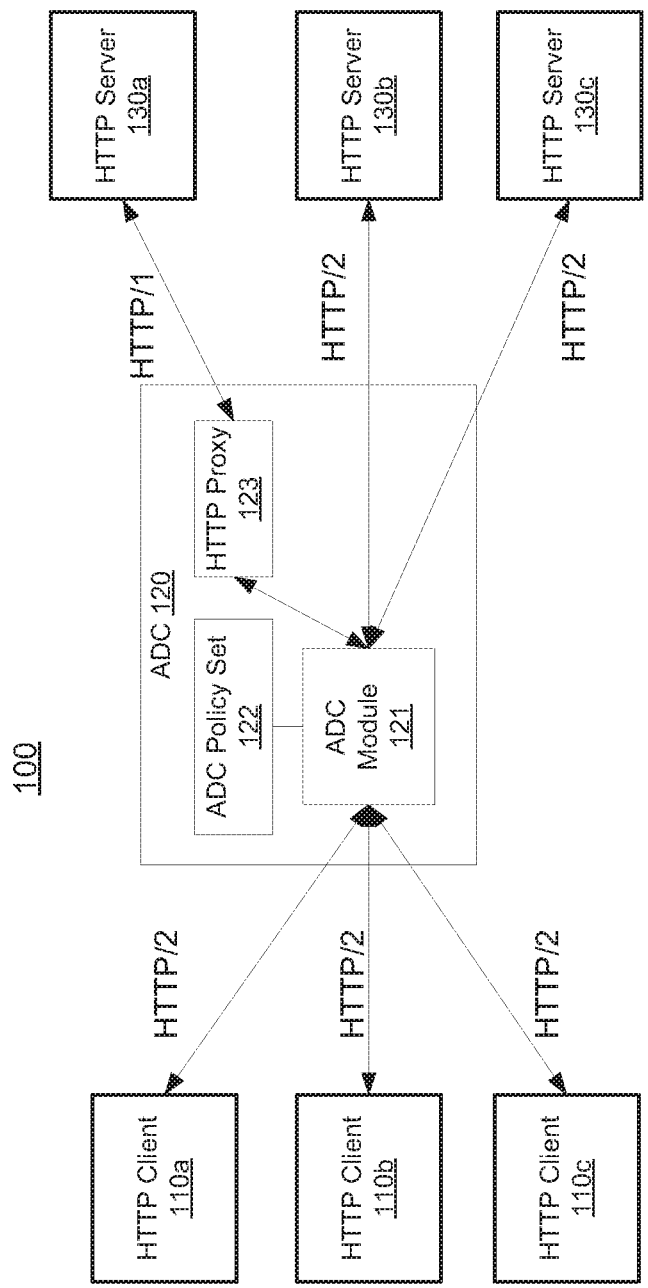
FIG. 1 illustrates an exemplary network architecture in accordance with an embodiment of the present invention.

Systems and methods are described for translating between an older version of HTTP and a newer version of HTTP by an HTTP proxy. According to an embodiment, an HTTP/2-HTTP/1 proxy receives an HTTP/2 request message from an HTTP/2-enabled client that is directed to an HTTP/1-only server. The HTTP/2-HTTP/1 proxy translates the HTTP/2 request message into an HTTP/1 request message and sends the HTTP/1 request message to the HTTP/1-only server. The HTTP/2-HTTP/1 proxy receives an HTTP/1 response message from the HTTP/1-only server and translates the HTTP/1 response message into an HTTP/2 response message. Then, the HTTP/2-HTTP/1 proxy sends the HTTP/2 response message to the HTTP/2-enabled client.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

If the specification states a component or feature "may", "can", "could", or "might" be included or have a characteristic, that particular component or feature is not required to be included or have the characteristic.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates an exemplary network architecture 100 in accordance with an embodiment of the present invention. In the present example, network architecture 100 comprises multiple HTTP clients 110a-110c, an application delivery controller (ADC) 120 and multiple HTTP server 130a-130c. ADC 120 may further comprise an ADC module 121, an ADC policy set 122 and an HTTP proxy 123. HTTP clients 110a-110c are HTTP/2-enabled clients. HTTP server 130a is an HTTP/1-only server, and HTTP servers 130b and 130c are HTTP/2 enabled servers. ADC 120 is a traffic control appliance sitting in front of multiple servers, such as HTTP server 130a-130c, handling HTTP/HTTPS and other protocols. ADC module 121 may be a load balancer that distributes traffic load across HTTP servers 130a-130c based on ADC policy set 122 that is defined by the administrator of the ADC 120. HTTP proxy 123 is an HTTP/2 enabled virtual server running on ADC 120 that is capable of translating between HTTP/1 messages and HTTP/2 messages so that the backend servers can still work in HTTP/1 mode while HTTP/2 enabled clients can take advantage of fundamental HTTP/2 features.

In the present example, ADC 120 receives an HTTP/2 request message from HTTP client 110a and the request message includes a URI of a web page. HTTP server 130c is selected among HTTP servers 130a-130c by ADC module 121 for handling the HTTP/2 request message based on ADC policy set 122. ADC 120 further checks if HTTP/2 is currently supported by HTTP server 130c. If HTTP server 130c supports HTTP/2, the HTTP/2 request message is sent to HTTP server 130c directly. After the HTTP/2 request message is processed by HTTP server 130c, a response message that is in HTTP/2 format is transferred back to ADC 120 and the HTTP/2 response message is forwarded to HTTP client 110a. The HTTP/2 request does not need any translation if the selected server supports HTTP/2. However, if HTTP server 130a which is an HTTP/1-only server is selected by ADC module 121 based on ADC policy set 122, the HTTP/2 request message is translated into an HTTP/1 request message by HTTP proxy 123. The translated HTTP/1 request message is then sent to HTTP server 130a for processing. After the request message is processed by HTTP server 130a, an HTTP/1 response message is sent back to HTTP proxy 123. HTTP proxy 123 then translates the HTTP/1 response message into an HTTP/2 response message and sends the HTTP/2 response message to HTTP client 110a.

In one embodiment, ADC 120 includes an HTTP proxy 123 that translates HTTP messages of a subsequent (higher) version (e.g., HTTP/2) into HTTP message of a prior (lower) version (e.g., HTTP/1). Therefore, ADC 120 may exchange HTTP/2 messages with clients that support HTTP/2 and load balance the messages among web servers that support HTTP/2 and web servers that support HTTP/1, for example.

Figure 2:
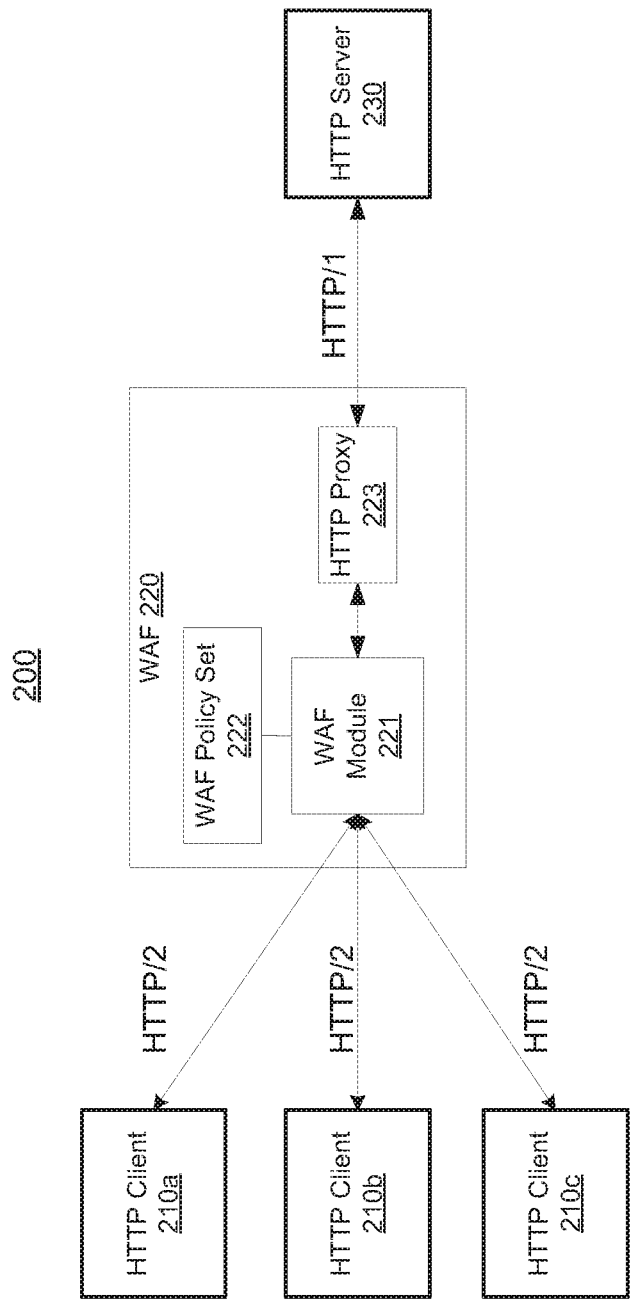
FIG. 2 illustrates another exemplary network architecture in accordance with an embodiment of the present invention.

FIG. 2 illustrates another exemplary network architecture 200 in accordance with an embodiment of the present invention. In the present example, network architecture 200 comprises multiple HTTP clients 210a-210c, a web application firewall (WAF) 220 and an HTTP server 230. WAF 220 may further comprise a WAF module 221, a WAF policy set 222 and an HTTP proxy 223. HTTP clients 110a-110c are HTTP/2 enabled clients and HTTP server 230 is an HTTP/1-only server. WAF 220 is a network security appliance that protects HTTP server 230 against web-based attacks. Rules defined in WAF policy set 222 are applied to conversations between HTTP clients 210a-210c and HTTP server 230 by WAF module 221 so that attacks, such as cross-site scripting and Structured Query Language (SQL) injection, may be detected and filtered. In the context of the present example, when an HTTP/2 request message is received by WAF 220, HTTP proxy 223 of WAF 220 translates the HTTP/2 request message into an HTTP/1 request message and sends the translated HTTP/1 request message to HTTP server 230 for processing. After receiving a response message in HTTP/1 format from HTTP server 230, HTTP proxy 223 translates the HTTP/1 response message into an HTTP/2 response message and then sends the translated HTTP/2 response message to the HTTP/2 enabled client. Therefore, HTTP server 230 which is an HTTP/1-only server may be used to service HTTP/2 messages from HTTP/2 enabled clients.

Figure 3:
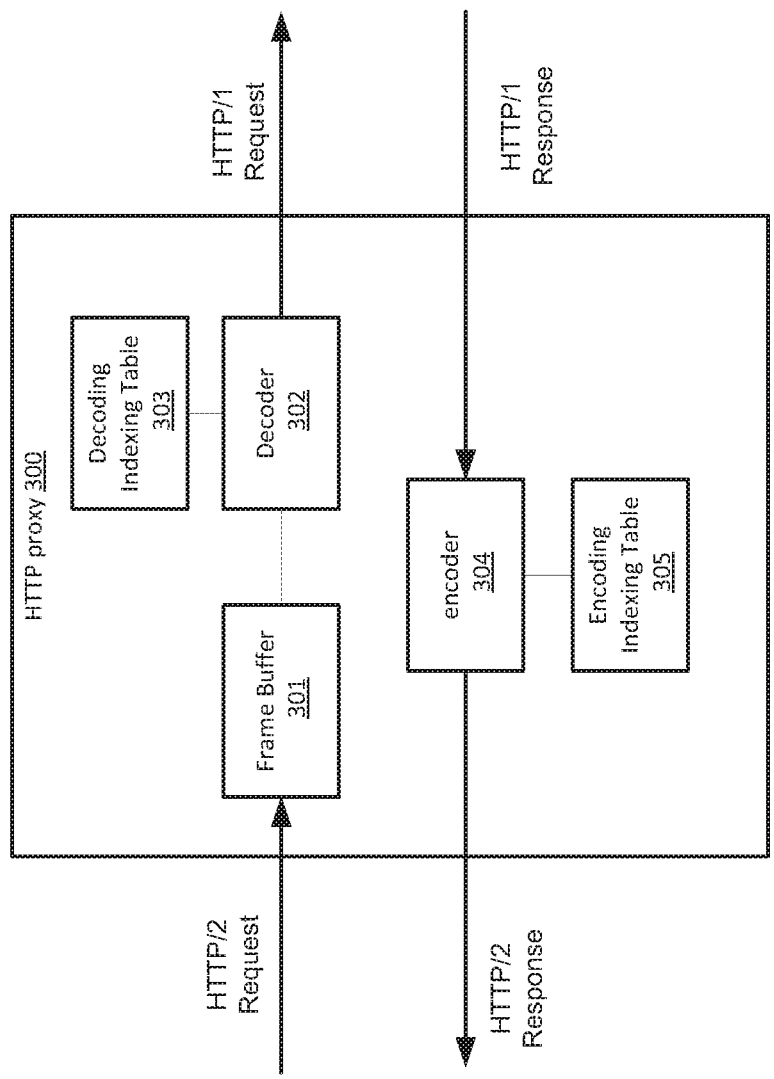
FIG. 3 illustrates exemplary functional units of an HTTP proxy in accordance with an embodiment of the present invention.

FIG. 3 illustrates exemplary functional units of an HTTP proxy 300 in accordance with an embodiment of the present invention. In the present example, HTTP proxy 300, which may represent HTTP proxy 123 and HTTP proxy 223 as shown in FIGS. 1 and 2, comprises frame buffer 301, decoder 302, decoding index table 303, encoder 304 and encoding index table 305.

HTTP/2 does not modify the application semantics defined in HTTP 1.x, such as HTTP methods, status codes, Uniform Resource Identifiers (URIs), and header fields. Instead, HTTP/2 introduces a new binary framing layer in which the HTTP protocol communication is broken down into small individual frames. Based on HTTP/2, HTTP/2 communication is performed within a single TCP connection and the single TCP connection can carry multiple bidirectional streams. Each stream is comprised of messages and each message may consist of one or more frames. In HTTP/2, a stream is a bidirectional flow of bytes within an established connection. Each stream has a unique integer identifier (1, 2, . . . , N). A message is a complete sequence of frames that map to a logical HTTP message, such as a request or response. A frame is the smallest unit of communication in HTTP/2, each frame includes a frame header that identifies the stream to which the frame belongs. All frames comprise head, length, type, flags, stream identifier and frame payload fields. In HTTP/2, a request message is translated by the HTTP/2 enabled client into a header list that includes zero or more header fields. For example, an HTTP GET request includes request header fields and no payload body and is therefore transmitted as a single HEADERS frame, followed by zero or more CONTINUATION frames containing the serialized block of request header fields. The HEADERS frame in the following has both the END_HEADERS and END_STREAM flags set and no CONTINUATION frames are sent:

```
GET /resource HTTP/1.1        HEADERS
Host: example.org       ==>     + END_STREAM
Accept: image/jpeg              + END_HEADERS
                                :method = GET
                                :scheme = HTTPs
                                :path = /resource
                                host = example.org
                                accept = image/jpeg
```

An HTTP POST request that includes request header fields and payload data is transmitted as one HEADERS frame, followed by zero or more CONTINUATION frames containing the request header fields, followed by one or more DATA frames, with the last CONTINUATION (or HEADERS) frame having the END_HEADERS flag set and the final DATA frame having the END_STREAM flag set:

```
POST /resource HTTP/1.1       HEADERS
Host: example.org       ==>     - END_STREAM
Content-Type: image/jpeg        - END_HEADERS
Content-Length: 123             :method = POST
                                :path = /resource
{binary data}                   :scheme = HTTPs
                              CONTINUATION
                                + END_HEADERS
                                content-type = image/jpeg
                                host = example.org
                                content-length = 123
                              DATA
                                + END_STREAM
                                {binary data}
```

In HTTP/2, the header list is serialized into a header block by an encoder of the client using HTTP header compression. Different header compression mechanisms may be used in HTTP/2.

One of the compression mechanisms is defined in an Internet-Draft by the HTTPbis Working Group entitled "HPACK—Header Compression for HTTP/2 (draft-ietf-HTTPbis-header-compression-12)" (hereafter "HPACK"), which is hereby incorporate by reference in its entirety for all purposes. Based on HPACK, HTTP header compression may use a static table and a dynamic table for associating header fields to indexes. The static table is a table that statically associates header fields that occur frequently with index values. This table is ordered, read-only, always accessible, and may be shared amongst all encoding or decoding contexts. The dynamic table is a table that associates stored header fields with index values. The dynamic table is specific to an encoding or decoding context. The dynamic table can be used by the encoder to index header fields repeated in the encoded header lists. The dynamic table consists of a list of header fields maintained in first-in, first-out order. The first and newest entry in a dynamic table is at the lowest index, and the oldest entry of a dynamic table is at the highest index. The dynamic table is initially empty. Entries are added as each header block is decompressed. The encoder decides how to update the dynamic table and as such can control how much memory is used by the dynamic table. The decoder updates the dynamic table during the processing of a list of header field representations. A header field may be compressed into a header field representation. An encoded header field can be represented either as an index or as a literal. An indexed representation defines a header field as a reference to an entry in either the static table or the dynamic table. A literal representation defines a header field by specifying its name and value. The header field name can be represented literally or as a reference to an entry in either the static table or the dynamic table. The header field value is represented literally. The static table and dynamic table may be combined into a single address space, such as decoding index table 303 and encoding index table 305, for defining index values.

The following examples show how header fields are encoded into header representatives and the corresponding decoding processes.

Example 1

The header field representation uses a literal name and a literal value. The header field is added to the dynamic table.

```
Header list to encode:
   custom-key: custom-header
Hex dump of encoded data:
   400a 6375 7374 6f6d 2d6b 6579 0d63 7573    | @.custom-key.custom
   746f 6d2d 6865 6164 6572                   | -header
Decoding process:
   40                                         | == Literal indexed ==
   0a                                         | Literal name (len =
                                              |   10)
   6375 7374 6f6d 2d6b 6579                   | custom-key
   0d                                         | Literal value (len =
                                              |   13)
   6375 7374 6f6d 2d68 6561 6465 72           | custom-header
                                              | -> custom-key: custom-
                                              |   head\er
Dynamic Table (after decoding):
[  1] (s = 55) custom-key: custom-header
      Table size: 55
Decoded header list:
   custom-key: custom-header
```

Example 2

The header field representation uses an indexed name and a literal value. The header field is not added to the dynamic table.

```
Header list to encode:
   :path: /sample/path
Hex dump of encoded data:
   040c 2f73 616d 706c 652f 7061 7468         | ../sample/path
Decoding process:
   04                                         | == Literal not indexed ==
                                              | Indexed name (idx = 4)
                                              |   :path
   0c                                         | Literal value (len = 12)
   2f73 616d 706c 652f 7061 7468              | /sample/path
                                              | -> :path: /sample/path
Dynamic table (after decoding): empty.
Decoded header list:
   :path: /sample/path
```

Example 3

The header field representation uses an indexed header field, from the static table.

```
Header list to encode:
   :method: GET
Hex dump of encoded data:
   82                                         | .
Decoding process:
   82                                         | == Indexed - Add ==
                                              | idx = 2
                                              | -> :method: GET
Dynamic table (after decoding): empty.
Decoded header list:
   :method: GET
```

As shown in the above examples, an HTTP/2 request message that is transmitted in one or more frames with header fields compressed are decoded and translated into an HTTP/1 request message by decoder 302 based on decoder indexing table 303. The translated HTTP/1 request message may be sent out to an HTTP/1 only server.

Figure 4:
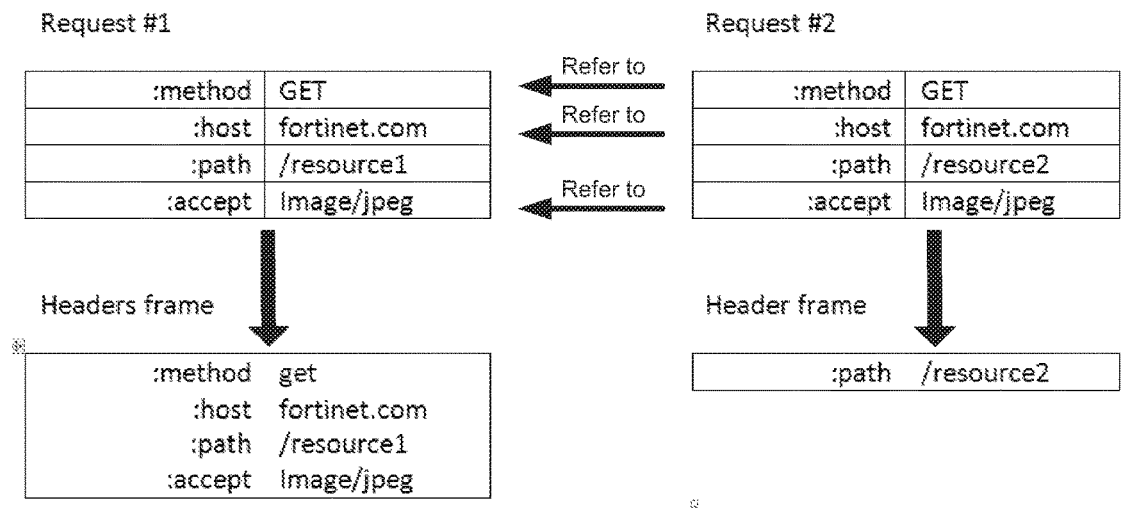
FIG. 4 illustrates HTTP/2 messages with header field compression in accordance with an embodiment of the present invention.

In another embodiment, another header field compression mechanism is used in HTTP/2 communication. In HTTP/1, each HTTP transfer carries a set of headers that describe the transferred resource and its properties. This metadata is always sent as plain text and adds anywhere from 500-800 bytes of overhead per request, and kilobytes more if HTTP cookies are required. To reduce this overhead and improve performance, HTTP/2 may compress header metadata that is repeated in messages. In this header field compression mechanism, a connection context data buffer, such as a reference table, is maintained on both the client and server to track and store previously sent key-value pairs. Header fields that have been stored in the reference tables will not be retransmitted in each request and response. Reference tables persist for the entire HTTP/2 connection and are incrementally updated both by the client and server. Refer to FIG. 4 where two request messages are sent to HTTP proxy 300 from an HTTP/2 enabled client. For a first request message:

GET /resource1 HTTP/1.1
Host: fortinet.com
Accept: text/plain

This request is encoded by the HTTP/2 enabled client into a header list that comprises four header fields:

:method=GET
:path=/resource1
:host=fortinet.com
accept=Image/jpeg

After the first request message is sent, both the client side and HTTP proxy 300 keep header key-value pairs of the first request message in its own reference table.

Then, when the following second request message is to be sent by the client:

GET/resource2 HTTP/1.1
Host: fortinet.com
Accept: Image/jpeg

This request is encoded by the HTTP/2 enabled client into a header list that comprises four header fields:

:method=GET
:path=/resource2
:host=fortinet.com
accept=Image/jpeg

Because only header field :path=/resource2 of the second request message is changed as compared with the first request message and the header fields of the first request message have been buffered as context data at both endpoints, only the different parts of header fields of the second request message are sent by the clients. Therefore, the HEADERS frame of the second messages is compressed to one header key-value pair only. After the second request message is received by HTTP proxy 300, decoder 302 may check its reference table where header key-value pairs of previous request messages are stored. Then decoder 302 combines the contents of reference table and the received header to form a complete header list of the second request message. Then, an HTTP/1 request message may be translated from the header list of the second request message.

After the translated HTTP/1 request message is sent to the HTTP/1-only server, the request is processed by the server. Then, an HTTP/1 response message may be transferred back to HTTP proxy 300. Encoder 304 may translate the HTTP/1 response message into an HTTP/2 response message. The translated HTTP/2 response message may be transferred to the HTTP/2 enable client via HTTP/2 so that the HTTP/2 enabled client may take advantage of the HTTP/2. A non-limiting example of a process for translating an HTTP/1 response message into an HTTP/2 response message is illustrated below.

For example, an HTTP/1 response message that includes header fields and payload data is broken down by encoder 304 as a HEADERS frame, followed by zero or more CONTINUATION frames, followed by one or more DATA frames, with the last DATA frame in the sequence having the END_STREAM flag set:

```
HTTP/1.1 200 OK HEADERS
Content-Type: image/jpeg ==> - END_STREAM
Content-Length: 123 + END_HEADERS
:status = 200
{binary data} content-type = image/jpeg
content-length = 123
DATA
+ END_STREAM
{binary data}
```

Encoder 304 may further encode the header fields of the response message into header field representatives based on response index table 305 and an HTTP/2 response message that is translated from the HTTP/1 response message is generated. The HTTP/2 response message is then sent to the HTTP/2 enabled client by HTTP proxy 300

Figure 5:
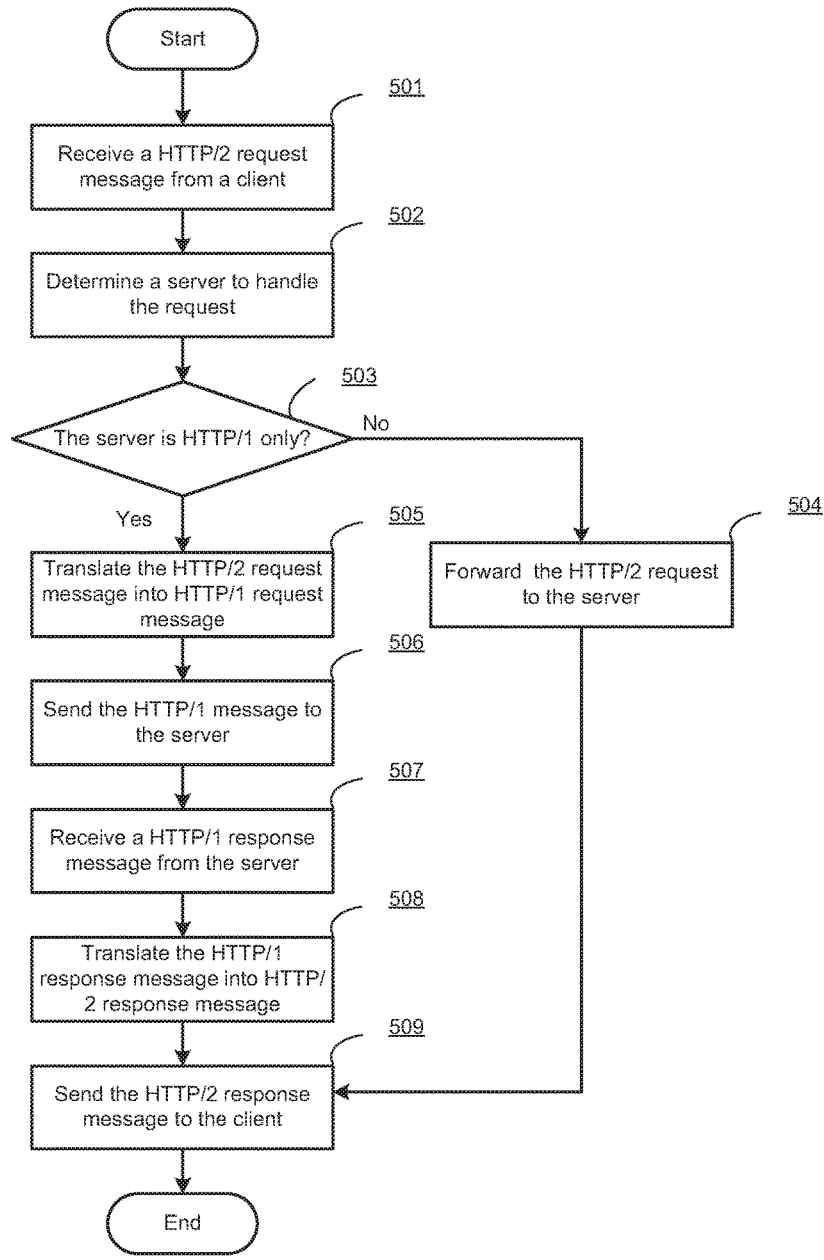
FIG. 5 is a flow diagram illustrating a method for translation between an HTTP/1 message and an HTTP/2 message by an ADC in accordance with an embodiment of the present invention.

FIG. 5 is a flow diagram illustrating a method for translation between an HTTP/1 message and an HTTP/2 message by an ADC in accordance with an embodiment of the present invention.

At block 501, an HTTP/2 request message originated by an HTTP/2 enabled client is received by an ADC. For example, the HTTP/2 enabled client that makes a request for an HTTP URI without prior knowledge about support for HTTP/2 may use the HTTP upgrade mechanism to begin an HTTP/2 connection with the ADC. The client may send an HTTP/1 request that includes an Upgrade header field with the "h2c" token and an HTTP-2—Settings header field to the ADC. The ADC that supports HTTP/2 accepts the upgrade request with a Switch Protocols response. After an HTTP/2 connection is established, request messages and response messages may be sent between the HTTP/2 enabled client and the ADC in HTTP/2 frames.

At block 502, the ADC may select a server from among multiple servers managed by the ADC or on behalf of which the ADC performs load balancing to handle the HTTP/2 request message based on policies defined by the administrator of the ADC. The ADC may determine which server is to be used for handling the HTTP/2 request message based on the resource that is requesting and/or current load status of the servers. For example, if the HTTP/2 request is requesting a resource that is on a web server that belongs to the finance department, the ADC may determine that the request message is to be handled by this web server.

At block 503, the ADC determines if the selected server is an HTTP/1 only server. In one embodiment, the ADC may maintain a configuration table that records configuration information, including HTTP versions supported, of the multiple servers. The ADC may check configurations of the selected server in the configuration table to determine if the selected server is an HTTP/1 only server. In another embodiment, the ADC may send an HTTP upgrade request to the selected server. If the upgrade request is not accepted by the selected server, the ADC may determine that the selected server is an HTTP/1 only server.

If the server is not an HTTP/1 only server, the HTTP/2 request message is forwarded to another server that is capable of handling the HTTP/2 request at block 504. The server will handle the HTTP/2 request directly and an HTTP/2 response message from the server will be forwarded to the HTTP/2 enabled client by the ADC at block 509 according to HTTP/2 syntax without needing translation.

If the server is determined to be an HTTP/1 only server, the ADC translates the HTTP/2 request message into an HTTP/1 request message at block 505. As the HTTP request is broken down into HTTP frames, such as header frames and data frames, the ADC may buffer HTTP frames of a request message received from the client and reconstruct the request message from the received HTTP frames. If the header frames are compressed based on the HPACK compression mechanism, an index table that stores mappings of header field representations to corresponding header fields are maintained at both endpoints of HTTP/2 connections. The header fields corresponding to header field representations of the decoding index table are added to a decoded header list so that the original header fields may be reconstructed. If the header fields are compressed based on a reference table that stores header fields that have been transmitted in a previous message, the complete header field list may be reconstructed by combining the received header fields which contains header fields that are different from that of a previous message with the header fields in the reference table. The reconstructed header fields, together with data frames if any, are translated into a plain text HTTP/1 request message according to HTTP/1 syntax.

At block 506, the ADC sends the translated HTTP/1 request message to the HTTP/1 only server for processing.

At block 507, the ADC receives an HTTP/1 response message from the HTTP/1 only server.

At block 508, the ADC translates the HTTP/1 response message into an HTTP/2 response message. The translation of HTTP/1 message into HTTP/2 message may be implemented based on HTTP/2 syntax.

Figure 6:
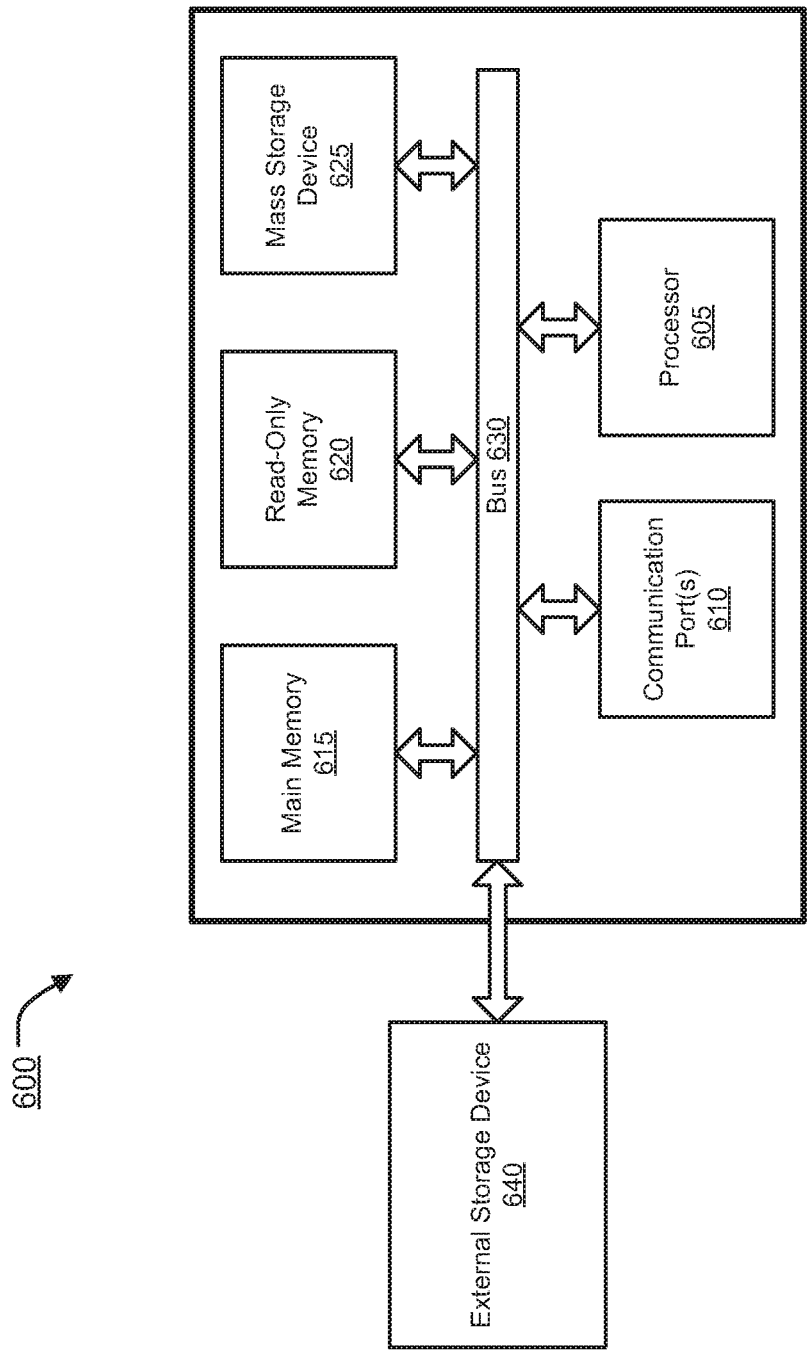
FIG. 6 is an exemplary computer system in which or with which embodiments of the present invention may be utilized.

FIG. 6 is an example of a computer system 600 with which embodiments of the present disclosure may be utilized. Computer system 600 may represent or form a part of an ADC (e.g., ADC 120), a WAF (e.g., WAF 220), an HTTP proxy, a network appliance, a network security device, a server or a client workstation.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with embodiments of the present invention.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
receiving, from a client, by a proxy that translates between a newer version of Hypertext Transfer Protocol (HTTP) and an older version of HTTP and running within an Application Delivery Controller (ADC) or a Web Application Filter (WAF) logically interposed between the client that supports the newer version of HTTP and a server that supports the older version of HTTP but does not support the newer version of HTTP, a first HTTP request message that is compliant with the newer version of HTTP and specifies a resource of the server, wherein the older version of HTTP comprises HTTP version 1 (HTTP/1) and wherein the newer version of HTTP comprises HTTP version 2 (HTTP/2);
creating, by the proxy, a second HTTP request message that is compliant with the older version of HTTP by translating the first HTTP request message;
sending to the server, by the proxy, the second HTTP request message;
responsive to the second HTTP request message, receiving from the server, by the proxy, a first HTTP response message that is compliant with the older version of HTTP and contains payload data representing content of the resource;
creating, by the proxy, a second HTTP response message that is compliant with the newer version of HTTP by translating the first HTTP response message, wherein header fields of the first HTTP request message and the second HTTP response message are compressed;
sending to the client, by the proxy, the second HTTP response message; and
wherein the proxy includes an index table in which mappings of header field representations to corresponding header fields are stored and wherein complete header fields of HTTP/2 request messages are decoded based on the index table.

2. The method of claim 1, further comprising:
establishing an HTTP/2 connection between the proxy and the client; and
establishing an HTTP/1 connection between the proxy and the server; wherein
the first HTTP request message and the second HTTP response message are transmitted between the proxy and the client on the HTTP/2 connection; and
the second HTTP request message and the first HTTP response message are transmitted between the proxy and the server on the HTTP/1 connection.

3. The method of claim 2, wherein the first HTTP request message and the second HTTP response message comprise one or more frames and the one or more frames are transmitted in a stream within the HTTP/2 connection.

4. The method of claim 3, wherein the one or more frames of the first HTTP request message are buffered by the proxy.

5. The method of claim 1, wherein the proxy includes a connection context data buffer in which header fields of a previous HTTP/2 message are stored; and complete header fields of HTTP/2 request message are reconstructed based on the connection context data buffer.

6. The method of claim 1, wherein the index table comprises a static table and a dynamic table.

7. The method of claim 1, wherein said creating, by the proxy, the second HTTP response message comprises:
breaking the first HTTP response message into one or more frames for the second HTTP response message based on HTTP/2 syntax; and
compressing header fields of the second HTTP response message based on a compression mechanism associated with HTTP/2.

8. A computer system comprising:
a non-transitory storage device having embodied therein instructions representing a proxy application that translates between a newer version of Hypertext Transfer Protocol (HTTP) and an older version of HTTP; and
one or more processors coupled to the non-transitory storage device and operable to execute the proxy application to perform a method comprising:
receiving, from a client that supports the newer version of HTTP, a first HTTP request message that is compliant with the newer version of HTTP and that specifies a resource of a server that supports the older version of HTTP but does not support the newer version of HTTP, wherein the older version of HTTP comprises HTTP version 1 (HTTP/1) and wherein the newer version of HTTP comprises HTTP version 2 (HTTP/2);

creating a second HTTP request message that is compliant with the older version of HTTP by translating the first HTTP request message;

sending the second HTTP request message to the server;

responsive to the second HTTP request message, receiving, from the server, a first HTTP response message that is compliant with the older version of HTTP and that contains payload data representing content of the resource;

creating a second HTTP response message that is compliant with the newer version of HTTP by translating the first HTTP response message wherein header fields of the first HTTP request message and the second HTTP response message are compressed;

sending the second HTTP response message to the client; and wherein the proxy includes an index table in which mappings of header field representations to corresponding header fields are stored and wherein complete header fields of HTTP/2 request messages are decoded based on the index table.

9. The computer system of claim 8, wherein the method further comprises:

establishing an HTTP/2 connection between the proxy and the client; and establishing an HTTP/1 connection between the proxy and the server; wherein the first HTTP request message and the second HTTP response message are transmitted between the proxy and the client on the HTTP/2 connection; and the second HTTP request message and the first HTTP response message are transmitted between the proxy and the server on the HTTP/1 connection.

10. The computer system of claim 9, wherein the first HTTP request message and the second HTTP response message comprise one or more frames and the one or more frames are transmitted in a stream within the HTTP/2 connection.

11. The computer system of claim 10, wherein the one or more frames of the first HTTP request message are buffered by the proxy.

12. The computer system of claim 8, wherein the proxy includes a connection context data buffer in which header fields of a previous HTTP/2 message are stored; and complete header fields of HTTP/2 request message are reconstructed based on the connection context data buffer.

13. The computer system of claim 8, wherein the index table comprises a static table and a dynamic table.

14. The computer system of claim 8, wherein said creating the second HTTP response message comprises:

breaking the first HTTP response message into one or more frames for the second HTTP response message based on HTTP/2 syntax; and compressing header fields of the second HTTP response message based on a compression mechanism associated with HTTP/2.

15. A method comprising:

receiving, from a client, by a proxy that translates between a newer version of Hypertext Transfer Protocol (HTTP) and an older version of HTTP and running within an Application Delivery Controller (ADC) or a Web Application Filter (WAF) logically interposed between the client that supports the newer version of HTTP and a server that supports the older version of HTTP but does not support the newer version of HTTP, a first HTTP request message that is compliant with the newer version of HTTP and specifies a resource of the server, wherein the older version of HTTP comprises HTTP version 1 (HTTP/1) and wherein the newer version of HTTP comprises HTTP version 2 (HTTP/2);

creating, by the proxy, a second HTTP request message that is compliant with the older version of HTTP by translating the first HTTP request message;

sending to the server, by the proxy, the second HTTP request message;

responsive to the second HTTP request message, receiving from the server, by the proxy, a first HTTP response message that is compliant with the older version of HTTP and contains payload data representing content of the resource;

creating, by the proxy, a second HTTP response message that is compliant with the newer version of HTTP by translating the first HTTP response message, including:

breaking the first HTTP response message into one or more frames for the second HTTP response message based on HTTP/2 syntax; and compressing header fields of the second HTTP response message based on a compression mechanism associated with HTTP/2; and sending to the client, by the proxy, the second HTTP response message.

16. The method of claim 15, further comprising:

establishing an HTTP/2 connection between the proxy and the client; and establishing an HTTP/1 connection between the proxy and the server; wherein the first HTTP request message and the second HTTP response message are transmitted between the proxy and the client on the HTTP/2 connection; and the second HTTP request message and the first HTTP response message are transmitted between the proxy and the server on the HTTP/1 connection.

17. The method of claim 16, wherein the first HTTP request message and the second HTTP response message comprise one or more frames and the one or more frames are transmitted in a stream within the HTTP/2 connection.

18. The method of claim 17, wherein the one or more frames of the first HTTP request message are buffered by the proxy.

19. The method of claim 18, wherein header fields of the first HTTP request message and the second HTTP response message are compressed.

20. The method of claim 19, wherein the proxy includes a connection context data buffer in which header fields of a previous HTTP/2 message are stored; and complete header fields of HTTP/2 request message are reconstructed based on the connection context data buffer.

21. The method of claim 19, wherein the index table comprises a static table and a dynamic table.

22. A computer system comprising:

a non-transitory storage device having embodied therein instructions representing a proxy application that translates between a newer version of Hypertext Transfer Protocol (HTTP) and an older version of HTTP; and one or more processors coupled to the non-transitory storage device and operable to execute the proxy application to perform a method comprising:

receiving, from a client that supports the newer version of HTTP, a first HTTP request message that is compliant with the newer version of HTTP and that specifies a resource of a server that supports the older version of HTTP but does not support the newer version of HTTP, wherein the older version of HTTP comprises HTTP version 1 (HTTP/1) and wherein the newer version of HTTP comprises HTTP version 2 (HTTP/2);

creating a second HTTP request message that is compliant with the older version of HTTP by translating the first HTTP request message;

sending the second HTTP request message to the server;

responsive to the second HTTP request message, receiving, from the server, a first HTTP response message that is compliant with the older version of HTTP and that contains payload data representing content of the resource;

creating a second HTTP response message that is compliant with the newer version of HTTP by translating the first HTTP response message, including:
  breaking the first HTTP response message into one or more frames for the second HTTP response message based on HTTP/2 syntax; and
  compressing header fields of the second HTTP response message based on a compression mechanism associated with HTTP/2; and sending the second HTTP response message to the client.

23. The computer system of claim 22, wherein the method further comprises:
  establishing an HTTP/2 connection between the proxy and the client; and
  establishing an HTTP/1 connection between the proxy and the server; wherein
  the first HTTP request message and the second HTTP response message are transmitted between the proxy and the client on the HTTP/2 connection; and
  the second HTTP request message and the first HTTP response message are transmitted between the proxy and the server on the HTTP/1 connection.

24. The computer system of claim 23, wherein the first HTTP request message and the second HTTP response message comprise one or more frames and the one or more frames are transmitted in a stream within the HTTP/2 connection.

25. The computer system of claim 24, wherein the one or more frames of the first HTTP request message are buffered by the proxy.

26. The computer system of claim 22, wherein header fields of the first HTTP request message and the second HTTP response message are compressed.

27. The computer system of claim 26, wherein the proxy includes a connection context data buffer in which header fields of a previous HTTP/2 message are stored; and complete header fields of HTTP/2 request message are reconstructed based on the connection context data buffer.

28. The computer system of claim 26, wherein the index table comprises a static table and a dynamic table.

* * * * *